July 12, 1938.                 C. W. SCHANTZ                 2,123,210
                              PROJECTOMETER
                            Filed Oct. 21, 1935
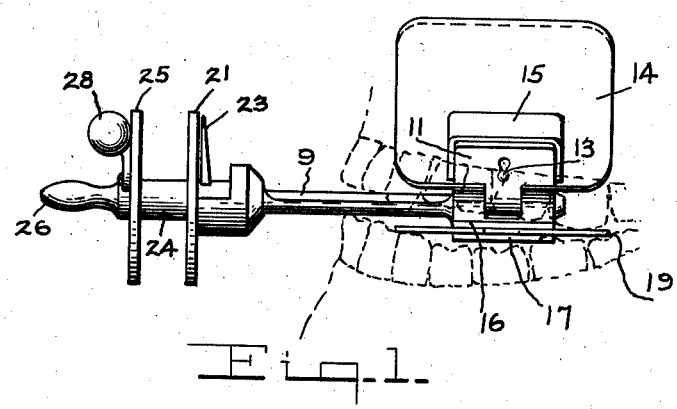
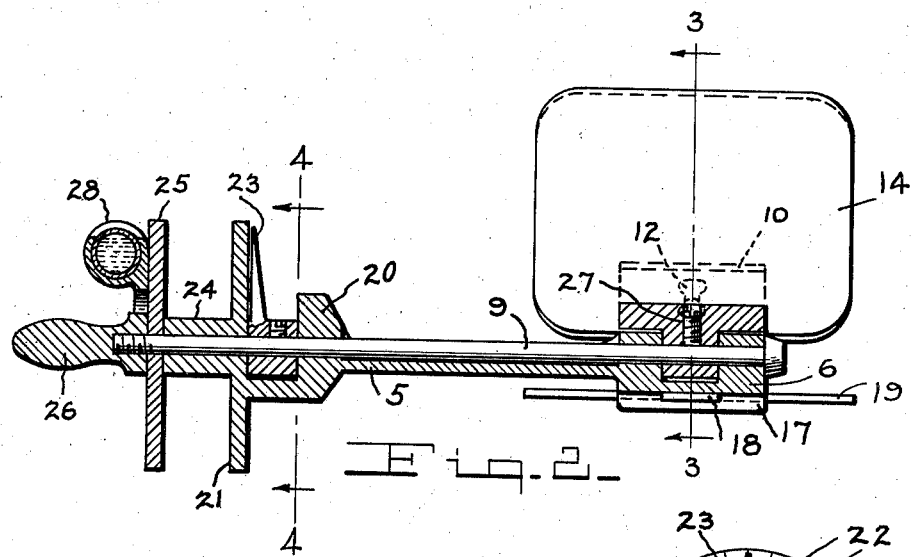
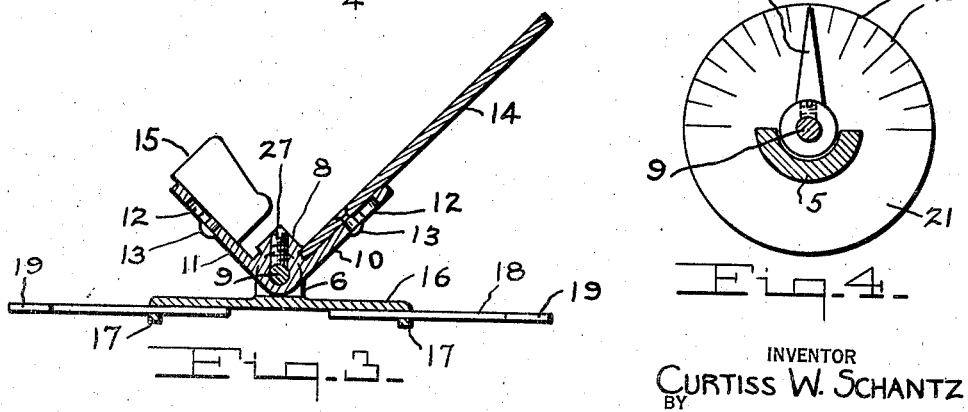
INVENTOR
CURTISS W. SCHANTZ.
BY
*Robert A. Lavender*
ATTORNEY Patented July 12, 1938

2,123,210

UNITED STATES PATENT OFFICE 2,123,210

PROJECTOMETER

Curtiss W. Schantz, United States Navy

Application October 21, 1935, Serial No. 45,860

8 Claims. (Cl. 250—34)

(Granted under the act of March 3, 1883, as amended April 30, 1928; 370 O. G. 757)

This invention relates to a device for determining the angle at which an X-ray film is disposed in the mouth of a person when the mouth is closed.

It is among the objects of this invention to provide a device that will show accurately the angular position of an X-ray film in the mouth of a patient with reference to a known and established datum plane. A further object is the general improvement of X-ray photography in the dental field by providing accurate data for determining the position of the X-ray beam to insure that said beam will be at the most favorable angle to produce clear and undistorted photographs.

In the drawing:

Fig. 1 is a side elevation of my present invention with the position of the teeth of the person indicated by dotted lines;

Fig. 2 is a longitudinal section thereof;

Fig. 3 is a transverse section on the line 3—3 of Fig. 2; and

Fig. 4 is a transverse section on the line 4—4 of Fig. 2.

The standard rule for projecting a true image of the teeth in making X-ray photographs thereof is to direct the rays perpendicular to a line bisecting the angle between the plane of the film and the plane of the teeth. This rule is correct in principle and comparatively simple but it is not always feasible in practice. This is due to the inability actually to see the plane of the film inside the oral cavity, and, therefore, the bisector of the angle between the film and the teeth is in a largely conjectural position.

The variations of the vaults of the palate in different individuals are great and it may be said in general that no two palates are the same in shape, size, or breadth. This adds to the uncertainty of the position occupied by the film. Since the teeth and the film are not parallel, it is apparent that, in order to prevent distortion of the image on the film, the angle at which the X-rays are directed upon the teeth and the film must be accurately determined, and unless this angle is accurate the pictures fail in correct detail and repeated pictures of the same tooth or structure may never be the same. The present invention provides means for determining definitely the angle of the film in the mouth and thus eliminates guess work as a factor in dental X-ray photography.

The body 5 of my device has at one end the spaced ears 6 and 7 between which the member 8 is mounted on a bolt 9 that extends the length of the instrument. The member 8 has flat portions 10 and 11 fixed thereto at such angle to each other that closing the jaws will, as hereinafter described, move the film into proper position for photographing the teeth, each of the portions 10 and 11 being provided with a key hole slot 12 to receive the headed studs 10 by which the film plate 14 and biting pad 15 are removably fastened to the portions 10 and 11 to be readily interchangeable. Attached to the ears 6 and 7 is a flat base 16 provided with downwardly turned flanges 17 wherein are formed aligned apertures in which the stems of the T-shaped bars 18 are adjustably disposed, the heads 19 thereof being adapted to lie upon the teeth of the lower jaw.

Adjacent the other end of body 5 is an ear 20 and spaced therefrom is a disc 21 having on its face adjacent to ear 20 calibrations 22 in units of angle, the middle calibration lying at right angles to the plane fixed by members 18. Fastened on bolt 9 between ear 20 and disc 21 is an index or pointer 23. Bearing against the free end of sleeve portion 24 of the body 5 is a disc 25, which is held between the said sleeve portion and handle 26, screwed on bolt 9 in such manner that the disc 25 may be readily turned on the bolt 9 but with sufficient friction to prevent rotation of the disc 25 by the weight of level 28 mounted thereon.

The manner of using my device is as follows: The angle between the plane defined by members 18 and the plane of film plate 14, when index 23 coincides with the median calibration 22, is known and, since the plane of the teeth is substantially perpendicular to the plane of members 18, the angle between the plane of the teeth and film plate 14 is also known. The patient's head is positioned against a headrest and is moved until the occlusal plane of the teeth, as determined by devices known in this art, is horizontal. The patient is instructed to open his mouth without moving the head, and the film plate 14 and biting pad 15 are inserted in the mouth with the head portions 19 of members 18 resting upon the lower teeth and the pad 15 between the upper and lower teeth on the side to be photographed. The patient then closes the jaws and the teeth contact the biting pad 15 which rotates the pad and film plate 14 so that the film on the plate 14 is in position for exposure.

The level 28 is used to check the horizontality of the occlusal plane, since it is with reference to the horizontal as a fixed datum plane that the X-ray tube is positioned. The center calibration 22 should be in the same plane as the transverse center line of level 28.

Since the member 8 is fixed on bolt 9 by the screw 27, the bolt 9 and index 23 are turned through the same angle as is the film on plate 14, which angle may be read by means of index 23 and calibrations 22. It having been known what was the original angle between plate 14 and the plane of the teeth, (substantially the angle between plate 14 and the middle calibration 22) and the angle through which the film has moved being also known, it is an easy matter to ascertain the position of the bisector of the angle between the film and the plane of the teeth. The X-ray tube is then so positioned that the imaginary axis of the X-ray beam is perpendicular to that bisector and the resulting picture will show clearly and without distortion the dental structure.

This invention may be manufactured and used by or for the Government of the United States of America for governmental purposes without the payment of any royalties thereon or therefor.

What is claimed is:

1. A device of the kind described, comprising a body member having an elongated transversely arcuate portion with a pair of spaced ears and a flat base adjacent one end thereof and an ear, an angularly calibrated disc spaced therefrom and a sleeve on the side of said disc opposite said ear at the other end thereof, all of said ears, said disc and said sleeve being coaxially apertured; a bolt extending through said apertures with its head against the outermost of said pair of ears and a handle screwed upon the other end thereof, a second disc on said shaft between said handle and said sleeve, a level on said second disc, an index fixed on said bolt between the first-mentioned disc and the ear adjacent thereto to cooperate with the calibrations on said first disc; a member fixed on said bolt between the ears of said pair, said member having two flat portions lying at an angle to each other, said portions being provided with key-hole slots, a biting pad and a film plate each respectively mounted on one of said flat portions, said pad and said plate being provided with elements to engage said slots, and means cooperating with said base to define a plane having known relation to said body portion, said pad, and said plate.

2. A device of the kind described, comprising a body portion having an end adapted to be inserted into the oral cavity of a person, means associated with said end to position said body in known relation with the occlusal plane of the teeth of such person, a member having flat portions lying at an angle to each other rotatably mounted in said end portion, a biting pad on one of said flat portions and a film plate on the other thereof, an angularly calibrated disc adjacent the other end of said body, an index mounted to rotate with said member and to cooperate with the calibrations on said disc, a disc mounted to be rotatable with said member, and a level on the last mentioned disc.

3. A device of the kind described, comprising a body portion having an end adapted to be inserted into the mouth of a person, means to fix the position of said portion with respect to a datum plane in the mouth, a film plate having a known angular relation with respect to said means, a biting pad associated with said plate at a known angle thereto, said plate and said pad being mounted on said body, to rotate together, means associated with said plate to indicate the angular position of said plate with respect to the said datum plane, and means carried by said body to indicate a horizontal plane, whereby, in conjunction with said angular position indicating means, the position of said plate with respect to the horizontal may be determined.

4. A device of the kind described, comprising a body portion having an end adapted to be inserted into the mouth of a person, two flat portions at an angle to each other rotatably mounted on said end portion, a flat portion fixed to said end and having downwardly turned flanges, said flanges being provided with aligned apertures, means adjustably mounted in said apertures to rest upon the teeth of such person when the device is in operative position in the mouth, means carried by said body to indicate the angular position of said two flat portions with respect to said adjustably mounted means, and means carried by said body to indicate a horizontal plane, whereby, in conjunction with said angular position indicating means, the position of one of said two flat portions with respect to the horizontal may be determined.

5. A device of the kind described, comprising a body portion having an end adapted to be inserted into the mouth of a person, means to support a film rotatably mounted on said end, a biting pad engageable by the teeth of such person fixed to said means in known angular relation thereto, means to position said supporting means and said pad in known relation to the occlusal plane of the teeth of such person, and means to indicate the position of said supporting means with respect to the horizontal when the teeth of such person are closed against said pad and said positioning means.

6. A device of the kind described, comprising a body having an end portion insertable in the mouth of a person, a film supporting member rotatably mounted on said end, means associated with said member and said end engageable by the teeth of such person to rotate said member in closing the mouth, at least one element of said means having a known initial angular relation to said member, and means to indicate the angular position of said member with respect to the horizontal when the mouth is closed.

7. A device of the kind described, comprising a body having an end portion insertable in the mouth of a person, a film supporting member rotatably mounted on said end, means associated with said member and said end engageable by the teeth of such person to rotate said member in closing the mouth, and means to indicate the angular position of said member with respect to a datum plane when the mouth is closed.

8. A device of the kind described, comprising a body having an end portion insertable in the mouth of a person, a film supporting member mounted on said end with the principal plane of said member parallel to the axis of said body, and means to indicate the angular position of said member with respect to a datum plane when the mouth is closed.

CURTISS W. SCHANTZ.